(12) United States Patent
Smith et al.

(10) Patent No.: US 11,230,275 B2
(45) Date of Patent: Jan. 25, 2022

(54) STEPPED PISTON FOR DISK BRAKE WITH OVERSIZED FOOTING

(71) Applicant: MANDO CORPORATION, Gyeonggi-do (KR)

(72) Inventors: Daniel Alan Smith, White Lake, MI (US); Galus Chelaidite, South Lyon, MI (US)

(73) Assignee: MANDO CORPORATION, Gyeonggi-do (KR)

( * ) Notice: Subject to any disclaimer, the term of this patent is extended or adjusted under 35 U.S.C. 154(b) by 144 days.

(21) Appl. No.: 16/672,400

(22) Filed: Nov. 1, 2019

(65) Prior Publication Data

US 2020/0158198 A1  May 21, 2020

Related U.S. Application Data

(60) Provisional application No. 62/768,035, filed on Nov. 15, 2018.

(51) Int. Cl.
*B60T 13/74* (2006.01)
*B60T 1/06* (2006.01)
(Continued)

(52) U.S. Cl.
CPC ............ *B60T 13/746* (2013.01); *B60T 1/065* (2013.01); *B60T 8/282* (2013.01); *B60T 13/741* (2013.01);
(Continued)

(58) Field of Classification Search
CPC .... F16D 65/0979; F16D 65/183; F16D 65/18; F16D 2125/34; F16D 2125/36; F16D 2125/38; F16D 2125/40
(Continued)

(56) References Cited

U.S. PATENT DOCUMENTS 4,819,768 A  *  4/1989  Czich .................... F16D 65/18
                                                       188/196 D
9,205,825 B2    12/2015  Isono
(Continued)

FOREIGN PATENT DOCUMENTS

DE    102009013005   *   8/2010
JP    2007-198407        8/2007

OTHER PUBLICATIONS

International Search Report for PCT/KR2019/015578 dated Mar. 13, 2020.
(Continued)

*Primary Examiner* — Robert A. Siconolfi
*Assistant Examiner* — San M Aung
(74) *Attorney, Agent, or Firm* — Ladas & Parry, LLP

(57) ABSTRACT

A piston configured for use in a brake system is disclosed. The piston can comprise: a body; and a footing; the footing positioned adjacent an end of the body, and having a recess that receives a central portion of the end; during operation of the brake system, the footing extends along a brake pad, and is configured to exert force on the brake pad during actuation of the disk brake system; and the footing having a face configured to contact the brake pad, the face having a length and a width, wherein the length is longer than an outside width of the body, and the length is greater than the width, and/or the face having a cross-sectional area normal to a direction of travel of the piston that is larger than a cross-sectional area of the piston body that is normal to the direction of travel of the piston.

20 Claims, 6 Drawing Sheets

(51) Int. Cl.
- *B60T 8/28* (2006.01)
- *B62D 5/04* (2006.01)
- *B62D 15/02* (2006.01)
- *F16D 65/097* (2006.01)
- *F16D 65/16* (2006.01)
- *G01B 7/315* (2006.01)
- *H02K 1/14* (2006.01)
- *H02K 1/27* (2006.01)
- *H02K 21/16* (2006.01)
- *H02K 29/03* (2006.01)
- *F16D 55/14* (2006.01)
- *F16D 121/24* (2012.01)
- *F16D 125/50* (2012.01)
- *F16D 127/06* (2012.01)

(52) U.S. Cl.
CPC ........... *B62D 5/046* (2013.01); *B62D 5/0442* (2013.01); *B62D 15/021* (2013.01); *F16D 65/0979* (2013.01); *F16D 65/16* (2013.01); *G01B 7/315* (2013.01); *H02K 1/146* (2013.01); *H02K 1/2766* (2013.01); *H02K 21/16* (2013.01); *H02K 29/03* (2013.01); *F16D 55/14* (2013.01); *F16D 2121/24* (2013.01); *F16D 2125/50* (2013.01); *F16D 2127/06* (2013.01)

(58) Field of Classification Search
USPC .................................................... 188/73.38
See application file for complete search history.

(56) References Cited

U.S. PATENT DOCUMENTS

| | | | |
|---|---|---|---|
| 2007/0209891 A1 | 9/2007 | Stensson et al. | |
| 2013/0105254 A1* | 5/2013 | Isono | F16D 65/18 188/72.3 |
| 2014/0290477 A1* | 10/2014 | Ruiz | F16D 65/0068 92/172 |
| 2018/0087590 A1* | 3/2018 | Chelaidite | F16D 65/183 |
| 2018/0298963 A1* | 10/2018 | Demorais | B60T 1/065 |

OTHER PUBLICATIONS

Written Opinion of the International Searching Authority for PCT/KR2019/015578 dated Mar. 13, 2020.

* cited by examiner

STEPPED PISTON FOR DISK BRAKE WITH OVERSIZED FOOTING

CROSS-REFERENCE TO RELATED APPLICATIONS

This application claims the benefit of Provisional Application 62/768,035 filed on Nov. 15, 2018, the disclosure of which is incorporated by reference in its entirety.

TECHNICAL FIELD

This disclosure relates to brake systems, such as vehicular brake systems, that include a piston for operation of the braking system.

BACKGROUND

Brake systems, such as disk brake systems on vehicles such as cars and trucks, can include caliper housings and one or more pistons within the caliper housings. In operation, the disk brake system can cause brake pads to press against opposite contact surfaces of a brake rotor in order to generate tangential friction force to cause a braking effect. The disk brake system can include a piston which in response to a signal moves against a brake pad to cause a braking effect.

The present disclosure relates to disk brake caliper pistons and piston systems, such as are used for various vehicles including automobiles, trucks, aircraft and the like. Embodiments of the disclosure include pistons having provision for an oversized bearing surface for contacting a brake pad, retraction systems for retracting the portions of the piston and/or sealing systems internal to the piston. Embodiments of the disclosure include pistons utilizing ball ramp actuators. Embodiments of the disclosure include pistons having a stepped surface.

As vehicles are made larger and heavier, greater braking force can be helpful in stopping the vehicle. Increased braking force can be accomplished in a number of ways, such as by pushing harder on the brake pedal, increasing the hydraulic advantage within the braking system to achieve greater pressure at the brake piston, increasing the torque delivered to a linear motion converter in the brake system, such as by increasing the torque of a motor or adding a gearbox or other torque multiplier, decreasing the frictional (e.g. viscous, mechanical, etc.) losses in the brake system, increasing the number of brake pistons to increase the brake force achieved for a given hydraulic pressure or to increase the diameter of the piston to increase the brake force achieved for a given hydraulic pressure.

Increasing the number of pistons can result in problems with implementing a parking brake system integrated with the brake piston. The reason for this can include that the spindle/nut arrangement, shown for example in FIG. 1, should be implemented on both pistons associated with a wheel or risk uneven wear and/or uneven application of brakes which can lead to other operational problems such as binding of the piston.

However, simply increasing the diameter of the piston can be limited by the width of the brake pad and by other system dimensions.

In addition, increasing the pressure that the piston operates at to increase the force can also carry a risk of distorting the brake pad due to the presence of a highly localized force (at the piston), which can also lead to uneven wear and other operational problems.

SUMMARY

In a first aspect disclosed herein, a piston configured for use in a disk brake system is provided. The piston comprising: a body; and a footing; the body having a lateral wall encircling an internal space within the piston; and an end wall at an end of the piston, the end wall having a central portion extending outward from the end wall; the footing positioned adjacent the end wall distal the interior space, and having a recess that receives the central portion; wherein during operation of the disk brake system, the footing is located between a portion of the end wall and a brake pad, and the footing extends along the brake pad, and is configured to exert force on the brake pad during actuation of the disk brake system; and the footing having a face configured to contact the brake pad, the face having a length and a width, wherein the length is longer than an outside width of the body, and the length is greater than the width, and/or the face having a cross-sectional area normal to a direction of travel of the piston that is larger than a cross-sectional area of the piston body that is normal to the direction of travel of the piston.

In a first embodiment of the first aspect, the width is wider than a width of the body.

In a second embodiment of the first aspect, the piston further comprises a spindle; a spindle nut; and a ball ramp actuator; wherein the spindle, spindle nut and the ball ramp actuator each being located at least partially within the internal space with the spindle nut threadably engaging the spindle, and the ball ramp actuator located between the end wall and the spindle nut and configured to push against the end wall and the spindle nut during operation of the disk brake system; and at least one of the spindle and spindle nut extending into an internal piston recess defined by the central portion.

In a third embodiment of the first aspect, the footing distributes braking force from the piston over a larger area of the brake pad than a cross-sectional area of the piston.

In a fourth embodiment of the first aspect, the footing has first and second ends located at respective first and second ends of the length and a midpoint corresponding to a central axis of the piston body, and during operation of the piston against a flat surface at 100 bar of pressure, the first and second ends deflect less than 0.3 mm or less than 0.2 mm or less than 0.1 mm in relation to the midpoint.

In a fifth embodiment of the first aspect, the piston further comprises a ring forming a seal against debris between the footing and the body.

In a sixth embodiment of the first aspect, the footing is pressed onto the body.

In a seventh embodiment of the first aspect, the footing is cemented onto the body.

In an eighth embodiment of the first aspect, the footing is integral to the body.

In a ninth embodiment of the first aspect, the piston further comprises a spindle; a spindle nut; and a ball ramp actuator; wherein the spindle, spindle nut and the ball ramp actuator each being located at least partially within the internal space with the spindle nut threadably engaging the spindle, and the ball ramp actuator located between the end wall and the spindle nut and configured to push against the end wall and the spindle nut during operation of the disk brake system; and at least one of the spindle and spindle nut extending into an internal piston recess defined by the central portion, wherein the ball ramp actuator comprises two balls, each located in respective ramp races in an upper race and a lower race, and upon relative rotation of the upper and lower race, the ball moves up the respective ramp races in the upper and lower races, causing the upper race and the lower race to move apart from one another and to exert a linear force between the spindle nut and the end wall.

In a tenth embodiment of the first aspect, the piston further comprises a spindle; a spindle nut; and a ball ramp actuator; wherein the spindle, spindle nut and the ball ramp actuator each being located at least partially within the internal space with the spindle nut threadably engaging the spindle, and the ball ramp actuator located between the end wall and the spindle nut and configured to push against the end wall and the spindle nut during operation of the disk brake system; and at least one of the spindle and spindle nut extending into an internal piston recess defined by the central portion, wherein the ball ramp actuator comprises two balls, each located in respective ramp races in an upper race and a lower race, and upon relative rotation of the upper and lower race, the ball moves up the respective ramp races in the upper and lower races, causing the upper race and the lower race to move apart from one another and to exert a linear force between the spindle nut and the end wall and the ball ramp actuator further comprises a spring, the spring acting upon the upper race and lateral wall to preload the ball ramp actuator such that upon actuation of the disk brake system via rotation of the spindle, the piston is moved by way of the lead screw before moving by way of the ball ramp actuator.

In an eleventh embodiment of the first aspect, the piston further comprises a spindle; a spindle nut; and a ball ramp actuator; wherein the spindle, spindle nut and the ball ramp actuator each being located at least partially within the internal space with the spindle nut threadably engaging the spindle, and the ball ramp actuator located between the end wall and the spindle nut and configured to push against the end wall and the spindle nut during operation of the disk brake system; and at least one of the spindle and spindle nut extending into an internal piston recess defined by the central portion, wherein the ball ramp actuator comprises two balls, each located in respective ramp races in an upper race and a lower race, and upon relative rotation of the upper and lower race, the ball moves up the respective ramp races in the upper and lower races, causing the upper race and the lower race to move apart from one another and to exert a linear force between the spindle nut and the end wall and a second ramp race extends from each respective ramp race to form a separate continuous track for each ball comprising one ramp race and one second ramp, and upon relative rotation of the upper and lower races in a first direction, each of the balls move up the respective ramp, causing the upper race and the lower race to move apart from one another and to exert a linear force between the spindle nut and the end wall, and upon rotation in a second direction, each of the balls move up the second ramp, causing the upper race and the lower race to move apart from one another and to exert a linear force between the spindle nut and the end wall.

In a twelfth embodiment of the first aspect, the piston further comprises a spindle; a spindle nut; and a ball ramp actuator; wherein the spindle, spindle nut and the ball ramp actuator each being located at least partially within the internal space with the spindle nut threadably engaging the spindle, and the ball ramp actuator located between the end wall and the spindle nut and configured to push against the end wall and the spindle nut during operation of the disk brake system; and at least one of the spindle and spindle nut extending into an internal piston recess defined by the central portion, wherein the ball ramp actuator comprises two balls, each located in respective ramp races in an upper race and a lower race, and upon relative rotation of the upper and lower race, the ball moves up the respective ramp races in the upper and lower races, causing the upper race and the lower race to move apart from one another and to exert a linear force between the spindle nut and the end wall and a second ramp race extends from each respective ramp race to form a separate continuous track for each ball comprising one ramp race and one second ramp, and upon relative rotation of the upper and lower races in a first direction, each of the balls move up the respective ramp, causing the upper race and the lower race to move apart from one another and to exert a linear force between the spindle nut and the end wall, and upon rotation in a second direction, each of the balls move up the second ramp, causing the upper race and the lower race to move apart from one another and to exert a linear force between the spindle nut and the end wall and each of the race ramps or each of the second ramps are service brake ramps, with the balls moving up the service brake ramps during operation of the brake system as a service brake, and each of the other of the race ramps and second ramps are parking brake ramps, with the balls moving up the parking brake ramps during operation the brake system as a parking brake, and the parking brake ramps comprise a stepped surface that the ball travels along.

In a thirteenth embodiment of the first aspect, the piston further comprises a spindle; a spindle nut; and a ball ramp actuator; wherein the spindle, spindle nut and the ball ramp actuator each being located at least partially within the internal space with the spindle nut threadably engaging the spindle, and the ball ramp actuator located between the end wall and the spindle nut and configured to push against the end wall and the spindle nut during operation of the disk brake system; and at least one of the spindle and spindle nut extending into an internal piston recess defined by the central portion, wherein the ball ramp actuator comprises two balls, each located in respective ramp races in an upper race and a lower race, and upon relative rotation of the upper and lower race, the ball moves up the respective ramp races in the upper and lower races, causing the upper race and the lower race to move apart from one another and to exert a linear force between the spindle nut and the end wall and the ball ramp actuator comprises three balls.

In a fourteenth embodiment of the first aspect, the piston further comprises a spindle; a spindle nut; and a ball ramp actuator; wherein the spindle, spindle nut and the ball ramp actuator each being located at least partially within the internal space with the spindle nut threadably engaging the spindle, and the ball ramp actuator located between the end wall and the spindle nut and configured to push against the end wall and the spindle nut during operation of the disk brake system; and at least one of the spindle and spindle nut extending into an internal piston recess defined by the central portion, wherein the ball ramp actuator comprises two balls, each located in respective ramp races in an upper race and a lower race, and upon relative rotation of the upper and lower race, the ball moves up the respective ramp races in the upper and lower races, causing the upper race and the lower race to move apart from one another and to exert a linear force between the spindle nut and the end wall and the ball ramp actuator comprises only two balls.

In a fifteenth embodiment of the first aspect, the piston is actuatable by hydraulic force acting upon the piston.

In a sixteenth embodiment of the first aspect, the piston further comprises a spindle; a spindle nut; and a ball ramp actuator; wherein the spindle, spindle nut and the ball ramp actuator each being located at least partially within the internal space with the spindle nut threadably engaging the spindle, and the ball ramp actuator located between the end wall and the spindle nut and configured to push against the end wall and the spindle nut during operation of the disk brake system; and at least one of the spindle and spindle nut extending into an internal piston recess defined by the central portion and the piston is actuatable by hydraulic force acting upon the piston.

In a second aspect, a method of applying a brake is provided. The method comprising applying a linear force to an interior surface of the end wall of a piston configured for use in a disk brake system, wherein the piston comprises: a body; and a footing; the body having a lateral wall encircling an internal space within the piston; and an end wall at an end of the piston, the end wall having a central portion extending outward from the end wall; the footing positioned adjacent the end wall distal the interior space, and having a recess that receives the central portion; wherein during operation of the disk brake system, the footing is located between a portion of the end wall and a disk brake pad, and the footing extends along the brake pad, and is configured to exert force on the brake pad during actuation of the disk brake system; and the footing having a face configured to contact the brake pad, the face having a length and a width, wherein the length is longer than an outside width of the body, and the length is greater than the width; whereupon a shoulder of the end wall moves the footing against the brake pad.

In a third aspect, a method of applying a brake is provided. The method comprising rotating the spindle of a piston configured for use in a disk brake system, wherein the piston comprises: a body; and a footing; the body having a lateral wall encircling an internal space within the piston; and an end wall at an end of the piston, the end wall having a central portion extending outward from the end wall; the footing positioned adjacent the end wall distal the interior space, and having a recess that receives the central portion; wherein during operation of the disk brake system, the footing is located between a portion of the end wall and a brake pad, and the footing extends along the brake pad, and is configured to exert force on the brake pad during actuation of the disk brake system; and the footing having a face configured to contact the brake pad, the face having a length and a width, wherein the length is longer than an outside width of the body, and the length is greater than the width, where the piston further comprises a spindle; a spindle nut; and a ball ramp actuator; wherein the spindle, spindle nut and the ball ramp actuator each being located at least partially within the internal space with the spindle nut threadably engaging the spindle, and the ball ramp actuator located between the end wall and the spindle nut and configured to push against the end wall and the spindle nut during operation of the disk brake system; and at least one of the spindle and spindle nut extending into an internal piston recess defined by the central portion, wherein the rotating of the spindle causes relative rotation of an upper race and a lower race of the ball ramp and a movement of a ball bearing along a ball ramp of the ball ramp actuator, causing the upper and lower races to move apart with the lower ramp applying a linear force to an interior surface of the end wall of the piston with a shoulder of the end wall moving the footing against the brake pad.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
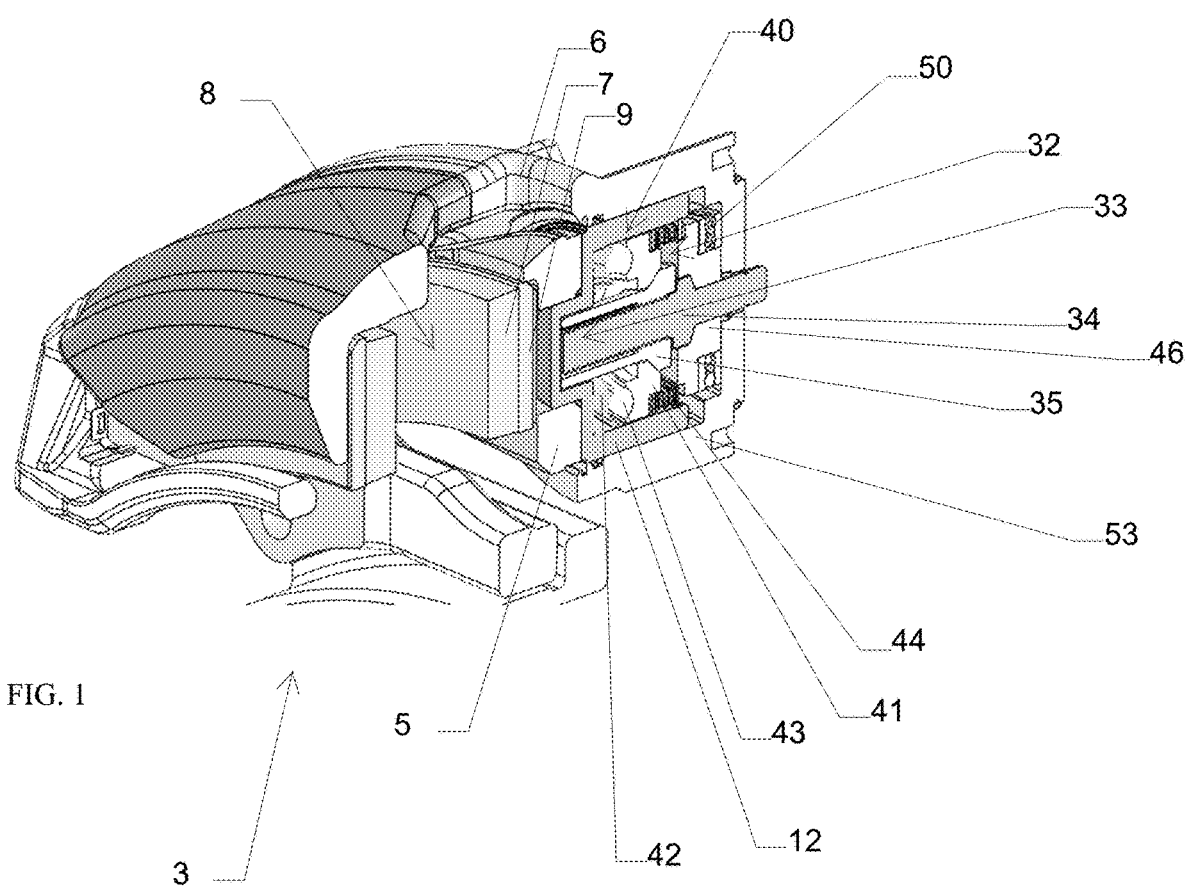
FIG. 1 shows an embodiment of a brake system.

FIG. 1 shows an embodiment of a brake system where a piston with a footing 5 is positioned in a caliper 6 where the footing 5 can press against brake pad 7 which in turn presses against rotor in rotor space 8 during operation of the brake.

Figure 2:
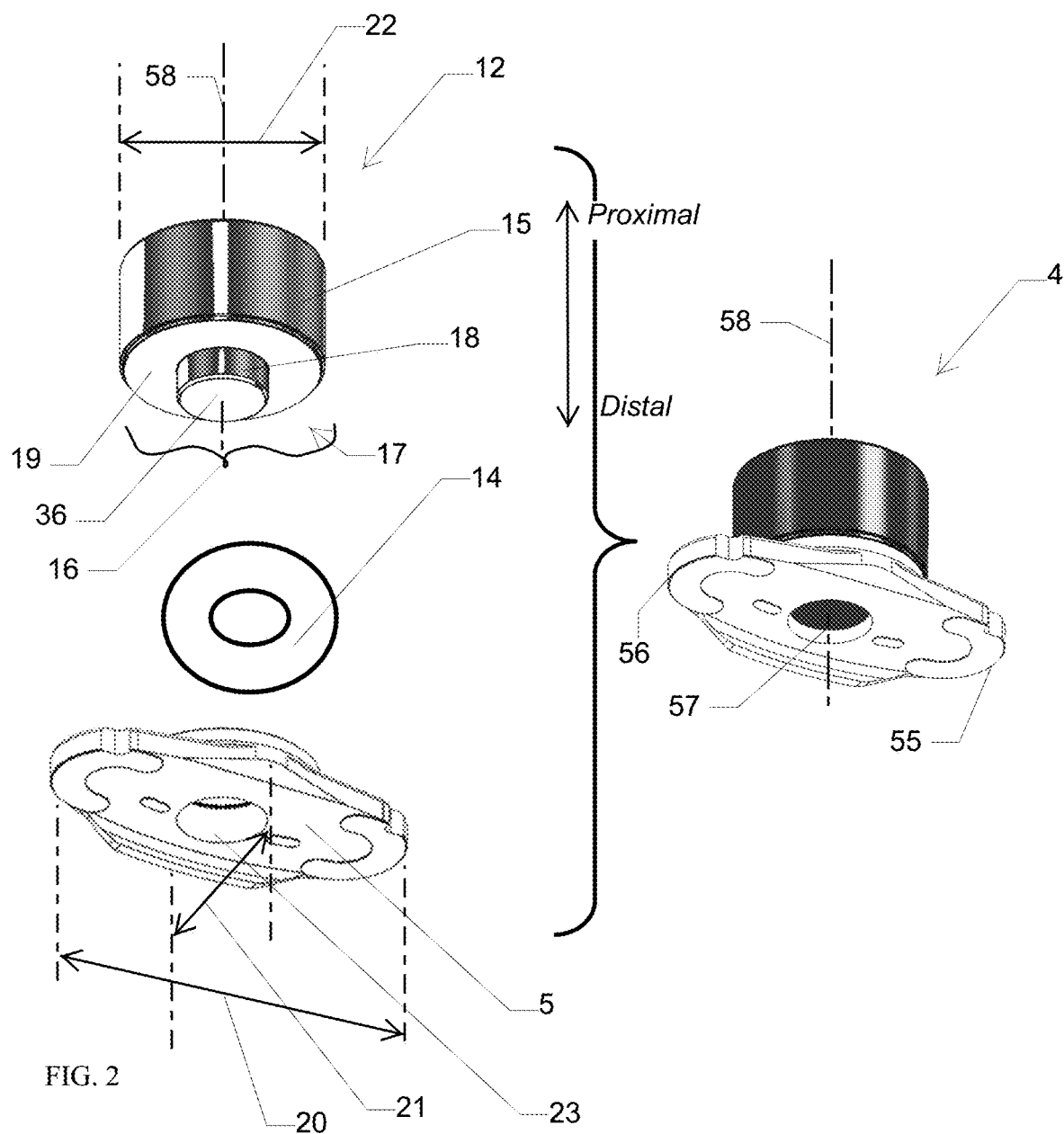
FIG. 2 shows an exploded view of an embodiment of a brake piston.

FIG. 2 shows an exploded view of a brake piston with footing 5 where the footing 5 is separated from the piston body 12 of the piston 4, and showing an optional malleable ring 14 which can be located between the piston body 12 and the footing 5.

Figure 3:
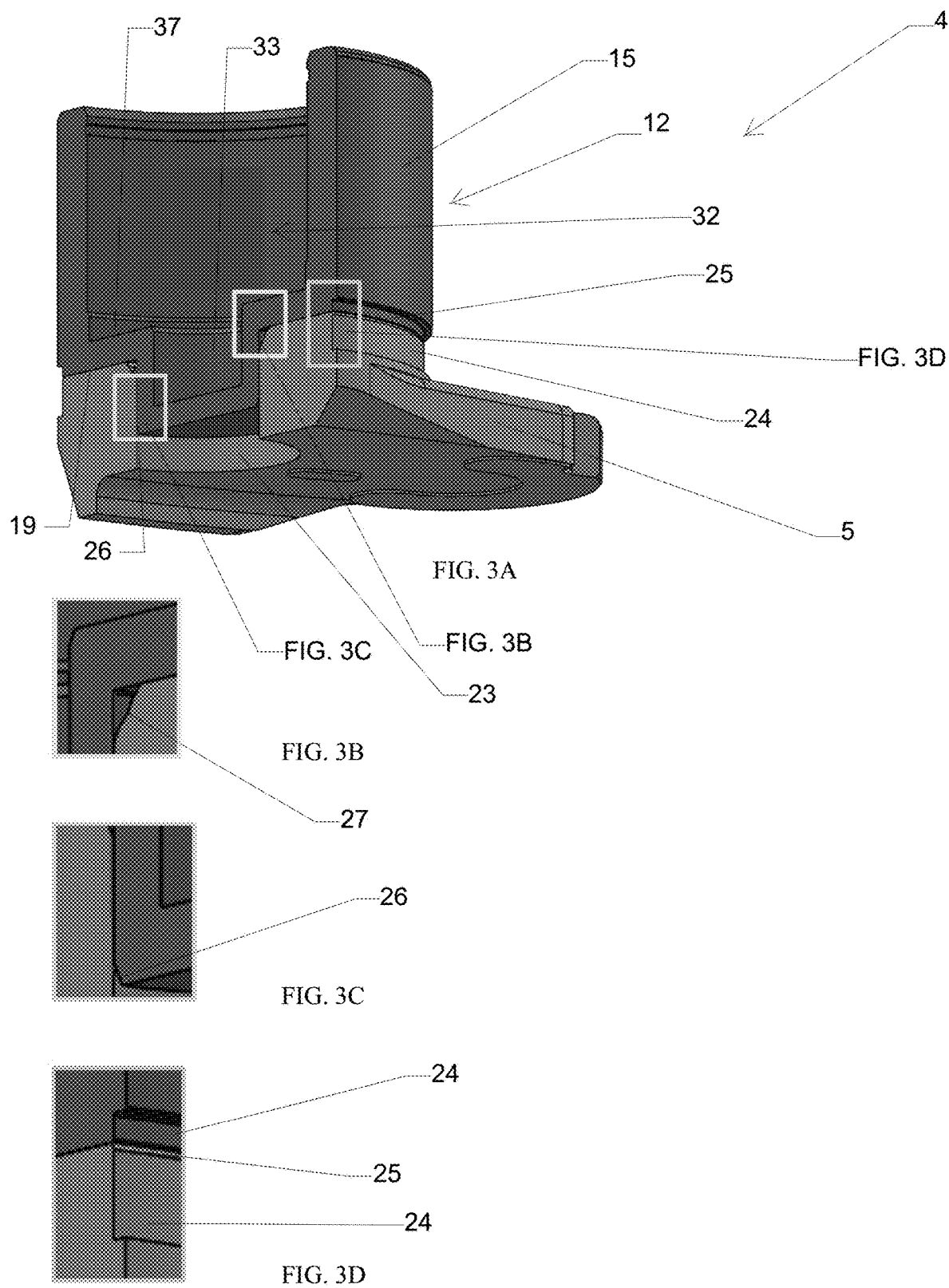
FIG. 3A-D shows an embodiment of a stepped brake piston.
Figure 4:
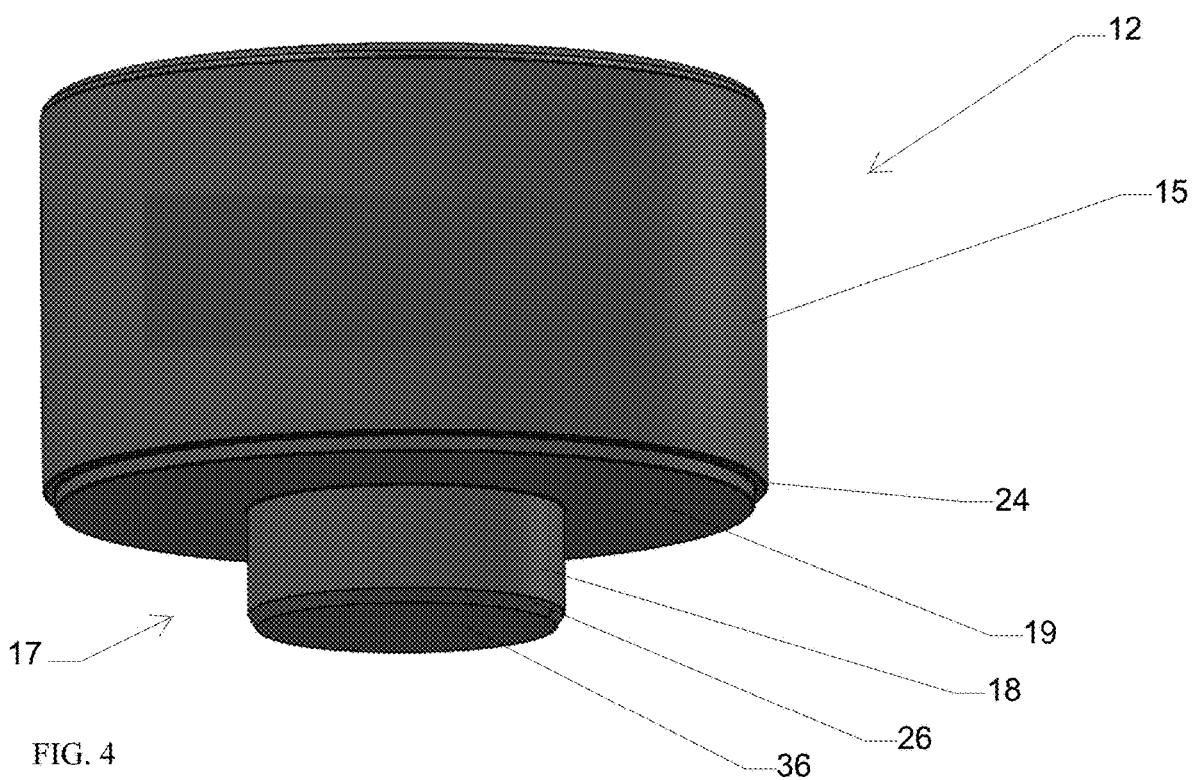
FIG. 4 shows an embodiment of a stepped brake piston body.

As shown in FIG. 3A, the body 12 of the piston 4 can include a lateral wall 15, surrounding a piston cavity 32 (FIG. 1, FIG. 3C), and closed at one end by an end wall 16. As shown in FIG. 4, the end wall 16 can have a stepped shape where a step 17 is formed by a central portion 18 extending from a shoulder 19.

As shown in FIG. 2, the footing can have a length 20 and a width 21 of the surface that contacts the back of a brake pad 7 (or an intervening material, such as a shim, through which the movement of the piston 4 including the footing 5 is transferred to the brake pad 7. In various embodiments, the length 20 of the footing 5 can be longer than the width 21 of the footing 5. In some embodiments, the width 21 of the footing 5 can be longer than the width 22 of the piston body 12. Extensions of dimensions of the footing, such as where the surface area of the footing 5 is greater than the cross-sectional area of the piston 4 can result in distributing the force delivered to the brake pad 7 over a greater area.

In some embodiments, it can be desirable to increase the strength of the footing 5 to reduce/prevent/eliminate distortion of the footing 5 during braking operations which can lead to uneven braking and brake wear. In some embodiments, the footing 5 can have a recess 23 which corresponds to and can receive a central portion 18 extending from the end wall 16 of the piston body 12, when present. In some embodiments, the footing 5 can be configured to not contact the distal face of the central portion, but only contact the shoulder 19 of the end face of the piston body 12 or the shoulder 19 and the sides of the central portion 18.

In various embodiments, the footing 5 can be assembled to other portions of the piston 4 by any appropriate method. In some embodiments, the footing 5 can placed adjacent to the piston body 12. In some embodiments, the footing 5 can be slipped onto the central portion 18 of the piston body 12, such as with a friction fit. In some embodiments, a slip fit can allow for subsequent removal and optionally reattachment of the footing to the piston body. In some embodiments, the footing 5 can be affixed by adhesive material. In some embodiments, the footing 5 can be permanently attached. In some embodiments, the footing 5 can be integral to the piston body 12, such as where the two parts are made together as one or where the material of the two parts is fused together, such as by welding.

In some embodiments, there can be an intervening material located between the footing and the piston body. In some embodiments, the intervening material can be a malleable material, such as a malleable ring 14, placed between the footing 5 and the piston body 12. In some embodiments of an intervening material, such as a malleable ring 14, the intervening material can exclude or limit intrusion of outside material, such as dust, dirt, road debris, grease, water, asphalt, brake fluid or other foreign material that can be present in the vicinity of a brake caliper, from entering between the footing and piston body. In some embodiments, the intervening material can fill gap(s) present between the footing 5 and piston body 12. In some embodiments, the intervening material can be adhered to one or more of the footing 5 and piston body 12. In some embodiments, the intervening material can conform to one or more of the footing 5 and piston body 12.

In some embodiments, a boot contact surface 24 can be present on the exterior surface of the lateral wall 15 and/or the footing 5 that can serve as a contact surface 24 for a boot extending between the piston 4 and another portion of the brake caliper 6, where the boot can exclude or limit intrusion of outside material, such as dust, dirt, road debris, grease, water, asphalt, brake fluid or other foreign material that can be present in the vicinity of a brake caliper 6, from entering between the piston 4 and the caliper 6. In one embodiment, a boot contact surface 24 is shown in FIG. 3A, where the boot contact surface 24 is present on an exterior surface of both the footing 5 and the lateral wall 15. FIG. 3D shows an embodiment of a detail of the boot contact surface 24 bridging the footing 5 and the lateral wall 15. Also shown in FIGS. 3A and 3D is an optional groove 25 for interfacing with the boot to stabilize and/or improve the sealing of the boot. In some embodiments, the boot contact surface 24 can be present exclusively on an exterior wall of the footing 5 or on an exterior surface of the lateral wall 15.

In some embodiments, a seal can be present along the exterior of the lateral wall 15 of the piston body 12 or can be located on or in an external surface of the footing that extends into the cylinder to serve as a hydraulic seal for hydraulic piston operation. In various embodiments, the seal can be an o-ring, such as a square-cut, round or other profile of o-ring, and in some embodiments, the seal, such as o-ring can be located in a groove on the exterior of the lateral wall or the external surface of the footing that extends into the cylinder or can be located in a groove within the cylinder of the caliper 6 that the piston 4 is positioned in.

In some embodiments of a piston body 12, a distal end of the central portion can comprise a relief edge 26, such as a chamfered edge, or an edge with another-shaped relief, which can assist in aligning the footing with the piston body (see FIGS. 3A and 3C). In addition, the footing can have a relief edge 27 at the end of the recess proximal the end wall of the piston body (see FIG. 3B.)

Footing

The footing 5 can be any appropriate material that provides sufficient dimensional stability and chemical resistance for the environment and conditions, including temperature, that the footing will be exposed to. In some embodiments, the footing 5 can be or comprise a metal, such as a type of steel, or an iron or iron alloy, or aluminum or aluminum alloy. In some embodiments, the footing can be or comprise a ceramic material, such as an oxide, a nitride, a carbide, or other sufficiently strong and durable material. In some embodiments, the footing can be or comprise a plastic material, such as a phenolic plastic or other sufficiently strong and durable material. In some embodiments, the footing 5 can be or comprise a carbon material, such as carbon fiber, or a glass, plastic or combination thereof. In some embodiments, the footing can be or comprise a composite of more than one material, such as one or more metal, ceramic, and/or carbon material, with optional binders and/or adhesive materials.

The footing can be sized and configured to reduce flexing of the footing and/or brake pad to an acceptable level, such as where the first and second ends 55, 56 of the footing (located at respective first and second ends of the length 20 of the footing) deflect during operation of the brake piston less than a specified distance in relation to a midpoint 57 corresponding to a central axis 58 of the piston body 12. (In some embodiments, the midpoint 57 can be located within recess 23.) In some embodiments, the deflection can be less than 0.3 mm, or less than 0.2 mm or less than 0.1 mm or less than 0.5 mm where operation of the brake includes application of a force (e.g. hydraulically, mechanically or electromechanically, etc. applied) of 100 bar at the piston body (force/piston body cross-sectional area). In some embodiments, the deflection can be described as a percentage of the brake travel, such as less than 5%, or less than 10% or less than 15% or less than 20% or less than 25% or less than 30% of the distance the brake pad moves at the piston central axis where operation of the brake includes application of a force (e.g. hydraulically, mechanically or electromechanically, etc. applied) of 100 bar at the piston body (force/piston body cross-sectional area). In some embodiments, the footing can contact a brake pad backing plate 9 (or an intervening material between the backing plate 9 and the footing) along the entire face of the footing or at discrete areas of the footing, such as at facial features 30, 31, to evaluate the amount of deflection.

In some embodiments, the footing can be sized and configured to increase the degree of uniformity of forces at the brake pad-brake rotor interface, such as by increasing the thickness (or changing the section modulus of the footing) or the flexural properties (e.g. increasing Young's modulus) of the footing, or by placement of facial features 30, 31 on the face of the footing to distribute forces applied to the brake pad backing plate 9. Improved uniformity of forces at the brake pad-brake rotor interface can provide more uniform wear of brake pads and can improve the noise-vibration-harshness (NVH) characteristics of the brake system. In some embodiments, the footing can be sized and configured with facial features 30 located toward one or both ends of the footing, to provide force application to the brake pad backing plate 9 (or intervening material) close to one or both ends of the footing. In some embodiments, the footing can be sized and configured with facial features 31 located at one or more locations between an end of the base 28 of the footing 5 and the recess 23 of the footing 5 (or located at the recess, such as where the recess 23 has footing material covering at least a portion of the recess.) In some embodiments, one or more facial feature 30 can be used with one or more facial feature 31. In some embodiments, the facial features 30, 31 can be sized and located to simulate a dual piston caliper. In some embodiments, the facial features 30, 31 can be present on the brake pad backing plate 9 (or intervening material) and extend toward and contact the footing (extend from the brake pad backing plate 9 and contact the intervening material), and perform in the same way as the facial features extending from the footing.

In some embodiments, the amount of flexing can also be affected by the brake pad or brake pad backing plate 9, such as by increasing the rigidity of the backing plate 9 and/or the placement of contact points, such as facial features 30, 31, on the face of the footing, to reduce the deflection of the footing. In some embodiments, a more rigid backing plate 9 can allow a reduction in the rigidity of the footing while achieving the same degree of uniformity of forces at the brake pad-brake rotor interface. In some embodiments, the placement of facial features 30, 31 can be used to distribute the forces transferred from the footing to the backing plate 9 to achieve a higher degree of uniformity of forces at the brake pad-brake rotor interface.

Figures 5A, 5B:
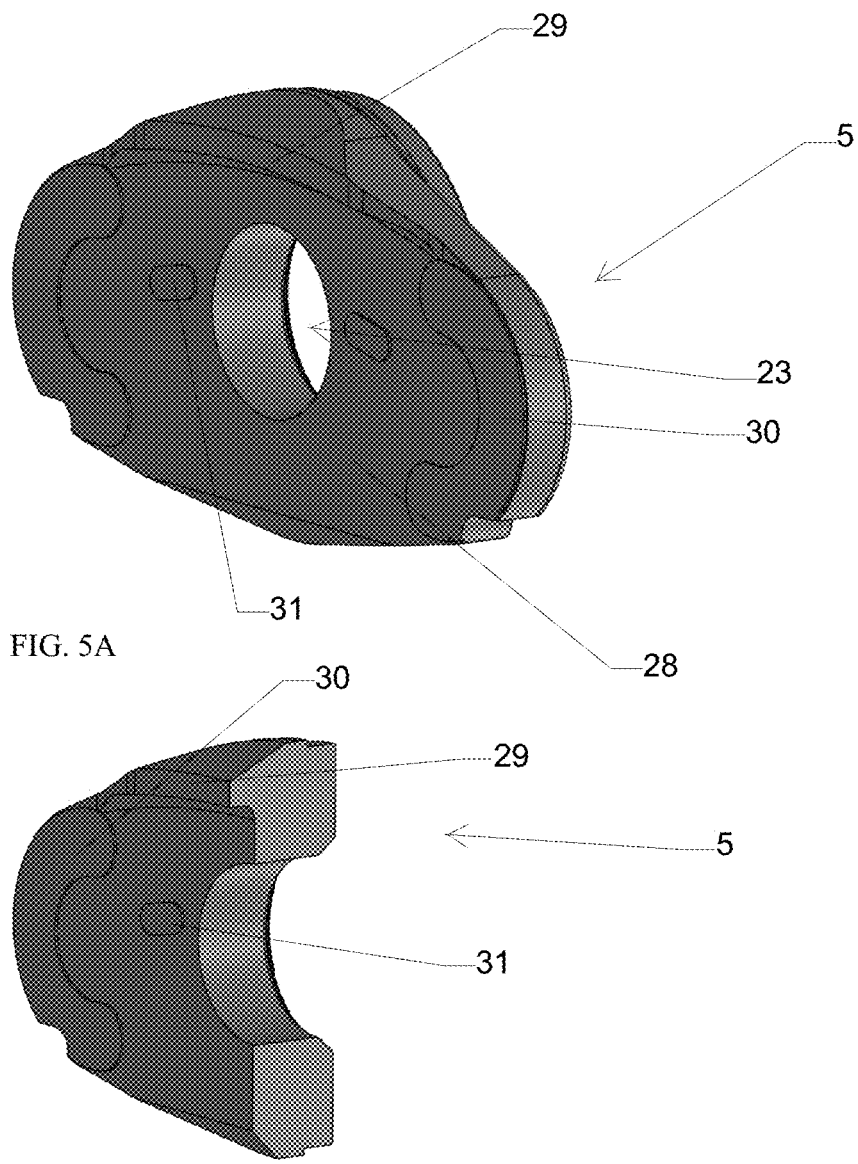
FIG. 5A shows an embodiment of a brake piston footing.
FIG. 5B shows a cross-section of the embodiment of a footing shown in FIG. 5A.

As shown in FIG. 5A, the footing can have an ovalized (or other shaped) base 28 which can be configured to push a brake pad 7 either directly or through an intervening material, such as a shim. The ovalized base 28 can be flat or can have facial features on the side toward the brake pad 7, such as one or more of a rim lip 29, one or more facial features 30 located toward one or both ends of the footing and/or one facial features 31 located at one or more locations between an end of the base 28 of the footing 5 and the recess 23 of the footing 5 (or located at the recess, such as where the recess 23 has footing material covering at least a portion of the recess), where in some embodiments one or more facial features can function in distributing forces and/or controlling or limiting deflection of the footing and/or brake pad. In some embodiments, a rim lip 29 can be present to interface with an edge of the brake pad or intervening material between the brake pad 7 and the footing 5, such as to provide alignment and/or to prevent relative rotation of the footing 5 and the brake pad 7, or intervening material. In some embodiments, facial features can include one or more spacers 30, 31 located on the face of the footing in order to assist in distributing the force applied to the brake pad in order to provide for more even brake pad wear and more reproducible braking results. In some embodiments, spacers 30 can be located at or near the ends of the base 28 of the footing 5. (In some embodiments, the base 28 can be ovalized or have rounded or squared or flattened ends.) In some embodiments, spacers 31 can be located at locations between an end of the base 28 of the footing 5 and the recess 23 of the footing 5 (or located at the recess, such as where the recess 23 has footing material covering at least a portion of the recess.)

As can be seen in FIG. 5B, the footing 5 can be made of a material that is sufficiently thick to provide a desired resistance to deformation which can lead to uneven brake wear and lack of repeatability of braking performance. The footing 5 can have a recess 23 for receiving the central portion 18 of the piston body 12, and the footing 5 can have a distribution of thicknesses, such as where the thickness of the footing is thicker at a region that is acted upon by the piston body 12, such as a region surrounding the recess 23, than at an end of the ovalized base 28 of the footing 5.

In some embodiments, the footing 5 can have a recess 23 configured to receive the central portion 18 of the piston body 12, while a face of the footing 5 is in operational communication with the end wall 16 of the piston body 12, such that during a braking operation, the end wall 16 of the piston body 12 pushes the face of the footing 5. In some embodiments, the end wall 16 can contact the face. In some embodiments, there can be an intermediate material, such as a malleable ring 14 between the end wall 16 and the face. In some embodiments, the force of the braking operation is transferred directly from the end wall 16 to the face. In some embodiments, the force of the braking operation is transferred from the end wall 16 to the face through the intermediate material, such as a malleable ring 14. In some embodiments, the braking force is partially transferred directly between the end wall 16 and the face and partially through an intermediate material such as a malleable ring 14.

In some embodiments, the stiffness of the footing can be supplemented by the stiffness of a disk pad backing plate 9, with a reduction of the stiffness of the footing 5 accompanied by an increase in the stiffness of the brake pad 7, such as by increasing the stiffness of the brake pad backing plate 9.

Piston Body

The piston body 12 can be any appropriate material that provides sufficient dimensional stability and chemical resistance for the environment and conditions, including temperature, that the footing 5 will be exposed to, to allow proper movement within the cylinder of a brake caliper, proper sealing, and interfacing with the footing 5, spindle 34, spindle nut 35, and ball ramp assembly 40. The piston body 12 can be or comprise a metal, such as a type of steel, or an iron or iron alloy, or aluminum or aluminum alloy or other metal or metal alloy or other suitable material. In some embodiments, the piston body 12 can be or comprise a plastic material, such as a phenolic plastic. In some embodiments, the piston body 12 can be or comprise a ceramic material, such as an oxide, a nitride, a carbide, or other sufficiently strong and durable material. In some embodiments, the piston body 12 can be or comprise a carbon material, such as carbon fiber, or be or comprise a glass or other material having suitable properties. In some embodiments, the piston body 12 can be or comprise a composite of more than one material, such as one or more metal, ceramic, and/or carbon material, with optional binders and/or adhesive materials.

As shown in FIG. 4, the piston body 12 can comprise a lateral wall 15 and can comprise a central portion 18 extending from the shoulder 19 of the piston 4. In some embodiments, there can be a boot contact surface 24 located at an end of the lateral wall 15 or elsewhere on the lateral wall 15 to contact a boot to exclude dust, debris, moisture or other undesirable material from between the piston body 12 and a cylinder in the brake caliper 6 which the piston body 12 is located at least partially within.

As shown in FIG. 3A, the piston body 12 can be hollow, with the lateral wall 15 surrounding a piston cavity 32 and the central portion 18 can be hollow with a piston cavity extension 33 extending into the central portion 18 and the central portion being closed by the closed end of the central portion 36. The central portion 18 extends from the shoulder 19 of the end wall 16. An interior surface 37 of the end wall is present within the piston cavity 32.

In some embodiments of a piston body 12, the piston cavity extension 33 can be sized to receive a portion of the spindle 34 and/or the spindle nut 35. In the embodiment shown in FIG. 1, the spindle 34 and the spindle nut 35 are shown as extending into the piston cavity extension 33, however, in some embodiments, only one of the spindle 34 and spindle nut 35 or both of the spindle 34 and spindle nut 35 during at least some operational steps of the brake system 3, can be located within the piston cavity 32 but not within the piston cavity extension 33.

Ball Ramp

Some embodiments of a brake caliper 6 can utilize a ball ramp assembly 40, such as that shown in FIG. 1. In FIG. 1, a piston 4 is shown which comprises a piston body, a ball ramp assembly 40, a thrust bearing 50, a spring 44 and collar 46. The ball ramp assembly 40 comprises an upper race 41, a lower race 42 and at least two ball bearings 43, such as 2, 3, 4 or more, located between the upper race 41 and the lower race 42. In some preferred embodiments, the number of ball bearings 43 can be limited to two. The use of only two balls can provide greater room for each ball ramp 47, 48 (see FIG. 6A-D) associated with each ball which in turn can provide a more gradual slope and smoother operation and/or allow for reduced size torque actuation system, such as a smaller motor, a lower torque motor and/or a smaller torque converter (e.g. gearbox) and/or lighter weight parts to impart or resist the forces associated with the piston 4. In order of assembly, the ball ramp assembly 40, the thrust bearing 50, the spring 44 can be positioned inside the piston cavity 32. In some embodiments, a clip can be positioned in a groove located in the cavity of piston 32, retaining the spring 44, upper race 41, ball bearing(s) 43, and/or lower race 42 in the piston cavity 32.

The thrust bearing 50, as discussed above, can comprise a ball bearing such as a ball bearing that in some preferred embodiments can comprise a double row of balls. In some embodiments, the upper race 41, lead screw, thrust bearing 50 can be located within the caliper housing 53 and the spindle 34 can be located at least partially within the caliper housing 53.

In some embodiments (including but not limited to those comprising only two ball bearings 43), the ball ramp assembly can be stabilized (laterally and/or rotationally) by the internal surface of the lateral wall 15 the internal surface of the shoulder 19 and/or the spindle nut 35.

FIGS. 9A-C show various features of an embodiment of a ball ramp assembly 40. In this discussion, both a service brake ramp 47 and a parking brake ramp 48 are discussed. In some embodiments of the brake system disclosed herein, both the service brake ramp 47 and the parking brake ramp 48 can be present. However, in some embodiments, only a service brake ramp 47 or only a parking brake ramp 48 would be present.

Figure 6A:
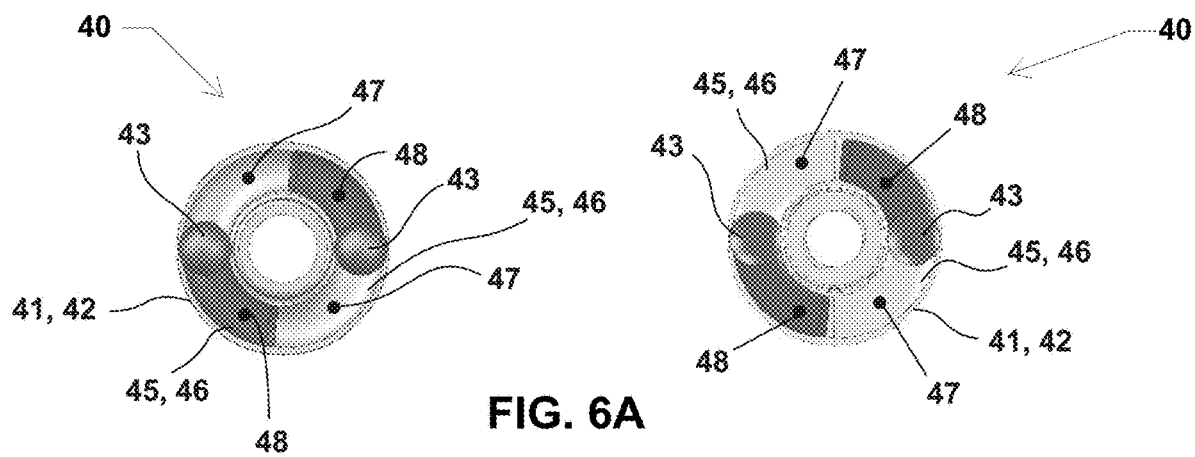
FIG. 6A-C shows embodiments of ball ramps in brake systems.
Figure 6B:
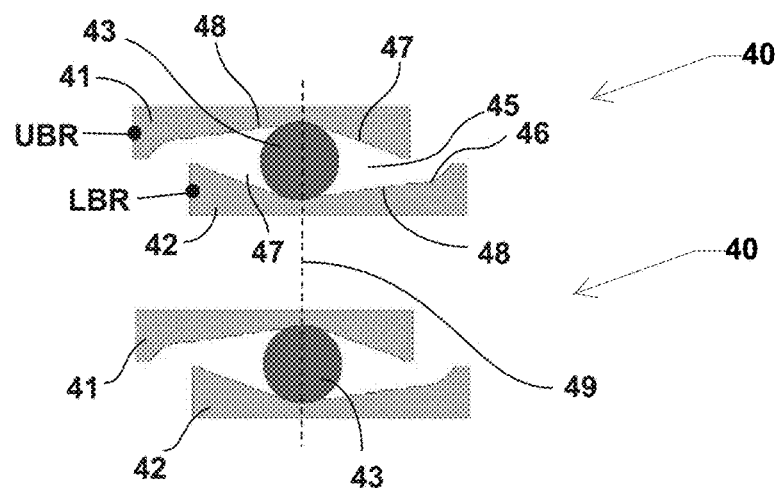

FIG. 6A shows an embodiment where two ball bearings 43 are located diametrically opposed to one another within upper race ball path 45 and lower race ball path 46. As shown in FIGS. 9A-C, each of the upper race ball path 45 and lower race ball path 46 have a home position 49 with a service brake ramp 47 extending in one direction from the home position 49 and a parking brake ramp 48 extending in the opposite direction around the circle of the upper race 41/lower race 42. There is a home position 49 for each ball bearing 43. As can be seen in FIG. 6B, one of the ball bearings 43 is contained between the upper race ball path 45 and lower race ball path 46. When the brake is released, each ball bearing 43 is located at the home position 49 between the service brake ramp 47 and parking brake ramp 48 for each of the upper and lower race ball paths. In the home position, the service brake ramp 47 of the upper race ball path 45 is located above the parking brake ramp 48 of the lower race ball path 46, and the parking brake ramp 48 of the upper race ball path 45 is located above the service brake ramp 47 of the lower race ball path 46. (Please note that designation of above, below, left, right, in front of, etc. as used in this disclosure are in reference to how depicted in the particular figure, and the actual orientation of a particular feature in a part in use will depend upon the orientation of that part on a vehicle or elsewhere and can be varied.)

In various embodiments, the ball ramp assembly discussed herein can be combined with a lead screw formed by the spindle 34 and spindle nut 35 with the lead screw formed by the lead screw threads on spindle 34 and the lead screw threads on the spindle nut 35 as shown in FIG. 1.

Figure 6C:
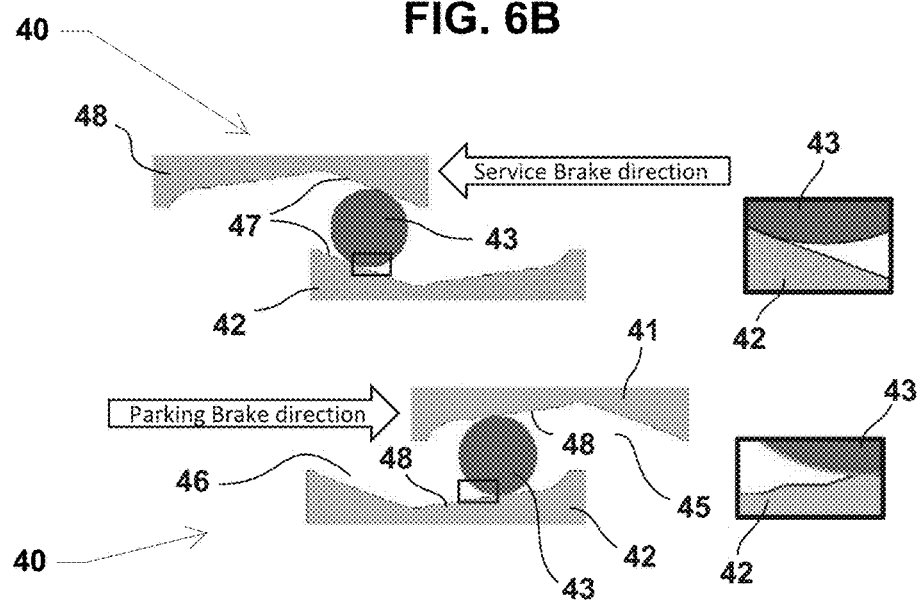

Actuation of the service brake, can occur by rotation of the upper race 41 in a first direction from the home position 49, and actuation of the parking brake can occur by rotation of the upper race 41 in a second direction, the second direction being opposite from the first direction, from home position 49. As can be seen in FIG. 6C, rotation of the upper race 41 in the first direction results in movement of the upper race ball path 45 in relation to the lower race ball path 46 such that the ball bearing 43 trapped therebetween interacts with, by rolling on the service brake ramps 47 of both the upper race ball path 45 and the lower race ball path 46. This interaction with the service brake ramps 47 results in the lower race 42 moving away from the upper race 41 linearly. As can be seen in FIG. 1, this linear movement will result in the lower race 42 pushing against piston body 12 and moving piston body 12 and footing 5 toward or against the brake pad 7.

As can also be seen in FIG. 6C, rotation of the upper race 41 in the second direction results in movement of the upper race ball path 45 in relation to the lower race ball path 46 such that the ball bearing 43 trapped therebetween interacts, by rolling with parking brake ramps 48 of both upper race ball path 45 and a lower race ball path 46. This interaction with the parking brake ramps 48 results in the lower race 42 moving away from the upper race 41 linearly. As can be seen in FIG. 1, this linear movement will result in the lower race 42 pushing against piston body 12 and moving piston body 12 and footing 5 toward or against brake pad 7.

In some embodiments of service and/or brake ramps 47, 48 in the upper race ball path 45 and/or the lower race ball path 46 can include one or more changes of slope to impart varying resistance to movement of a ball bearing 43 along the ramp, such as where movement along a portion of a ramp having greater slope requires greater force than movement along a portion of a ramp having lesser slope. In some embodiments, the change in slope can be gradual. In some embodiments, the change in slope can occur by steps or can approximate steps. In some embodiments, portions of the ramp can have flat portions (slope is zero or approximately zero) and/or can be negative (resulting in a decrease in the force required to move along the respective portion of the ramp.) In some embodiments, the use of changes in slope over a brake ramp can allow for a holding of a position of the service or parking brake ramp in the upper race ball path in relation to the service or parking brake ramp in the lower race ball path, and therefore the maintenance of a corresponding clamping force on the brake disk 34, while reducing or eliminating the torque imparted through the spindle.

In some preferred embodiments, the service brake ramp 47 in the upper race ball path 45 and the service brake ramp 47 in the lower race ball path 46 can have a constant slope or a continuously increasing slope for the entire length of the service brake ramps 47, while the parking brake ramp 48 in the upper race ball path 45 and the parking brake ramp 48 in the lower race ball path 46 can have a stepped form of a series of positively sloped regions interrupted by flat portions. In some embodiments, when the ball bearing 43 is positioned on a flat portion of the parking brake ramp 48 of the upper race ball path 45, the ball bearing 43 is also positioned on a flat portion of the parking brake ramp 48 of the lower race ball path 46. Such a configuration of flat portions can maintain the clamp force between the inner and outer brake pads on the brake disk, without maintaining torque on the spindle and therefore can result in a parking brake that does not self-release (does not release except with a counter-torque applied by the spindle.)

During operation of the service brake, the spindle 34 is turned, such as by a motor, in the first direction. Initially, the spindle 34 will move in relation to the spindle nut 35 with the spindle 34 and spindle nut 35 acting as a lead screw to move the upper race 41 and lower race 42 against piston body 12 at an internal surface of the shoulder 19. Movement at the ball ramp is precluded at this time due to the preload imposed by spring 44 acting between the upper race 41 and the piston body 12 or the upper race 41 and the collar 46 to increase friction within the ball ramp actuator 40. When the piston 4 closes the gap between piston 4 and a corresponding brake pad 7, the brake pad 7 will push against piston 4 which results in increasing the friction torque at lead screw. When the friction torque within the lead screw is sufficient and overcomes the preload torque provided by spring 44, the upper race 41 of the ball ramp assembly 40 will move in relation to the lower race 42, to move piston body 12 further and to further apply braking force to the brake pad by way of piston body 12, footing 5 and brake pad 7.

During release of the service brake, the sequence of events is essentially reversed with the spindle 34 being moved in the second direction, opposite the first direction, with the ball ramp actuator 40 moving back to the home position 49 and then due to the reduced force applied to piston 4 by brake pad 7, the spindle 34 moves in relation to the spindle nut 35 at lead screw. During the rotation of the spindle (and return of the ball bearings 43 to the home position 49), the spring 44 retracts the piston 4 into the caliper housing 53. After an appropriate additional rotation of spindle 34, rotation is stopped.

During operation of the parking brake when only parking brake ramps are present in the ball ramp assembly 40, the operation of the parking brake is substantially the same as operation of the service brake discussed above.

During operation of the parking brake where both parking brake ramps and service brake ramps are present within the ball ramp assembly 40, the spindle is first moved in the first direction, which moves piston body 12 and footing 5 in a linear direction toward a corresponding brake pad 7 by way of lead screw. When the piston body 12 and footing 5 contacts the brake pad 7, the opposing force exerted by the brake pad 7 against the piston 4 increases. Upon sufficient opposing force applied by brake pad 7 to piston 4, the preload force from spring 44 will be overcome due to the increase in friction in lead screw, and the upper race 41 of the ball ramp assembly 40 will begin to rotate in relation to the lower race 42 of the ball ramp assembly with the ball bearings 43 moving along the ball ramps, such as the service brake ramps 47 or the parking brake ramps 48. Restraint of the piston 4 within the caliper housing 53 against rotation and/or linear motion in relation to the caliper housing 53 allows reversal of the direction of rotation of the spindle (rotation in the second direction) and operation of the ball ramp assembly 40 in the opposite direction. Such reversal of direction can be utilized in various embodiments including, but not limited, to embodiments having both service brake ramps 47 and parking brake ramps where the utilization of the service brake ramp 47 or the parking brake ramps 48 can be selected for a braking operation. In some embodiments, the reversal of direction can allow the ball bearings 43 to move up a different ramp than when the direction is not reversed. In one embodiment, rotation of the ball ramp assembly in the reverse direction can be facilitated by restricting movement of the piston 4 (laterally or rotationally) within the caliper housing 53 by placing the lead screw under sufficient load that the torque to loosen the lead screw (rotation in the second direction which would move the piston 4 away from the brake pad 7) is greater than the torque to rotate the ball ramp on the parking brake ramp 48. In some embodiments, restricting movement of the piston 4 (laterally and/or rotationally) can be accomplished by, for example, features that include one or more solenoids and/or voice coil actuators.

During release of the brake utilizing ball ramps engaged with reversed rotation, the sequence of events is essentially reversed with the spindle 34 moving in the first direction, causing the upper race ball path 45 to move in relation to the lower race ball path 46 back to the home position 49. At this point, the force imparted by the brake pad backing plate 9 to the piston 4 and from the piston 4 through the ball ramp actuator 42 lead screw is reduced, reducing the friction at lead screw. Rotation of spindle 34 then continues in the second direction allowing the upper race 41 to retract by action the spring 44 retracting the piston 4 into the caliper housing 53 and pulling piston 4 away from brake pad backing plate 9. After sufficient rotation of spindle 34, rotation is stopped.

A full retraction stop of the piston can be provided in some embodiments by having the spindle nut 35 backstop against the spindle 34 or against the collar 46, such as is shown in FIG. 1. In various embodiments, a full retraction stop can be provided within a brake piston assembly in order to facilitate activities that are assisted by retracting the piston 4 into the caliper housing 53, such as removal or installation of a caliper 6 into a vehicle or installation, removal or replacement of one or more brake pad in a caliper housing. Use of a full retraction stop can include operation of the brake to retract the piston body 12 into the caliper housing 53 until the full retraction stop is utilized, such as by contacting by a proximal portion of the spindle nut 35 with the spindle 34 or the collar 46, or a stop extending from an inner surface of the lateral wall 15.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. Use of language such as "approximately", "somewhat", "about", "nearly" and other terms of degree that appear within this disclosure are intended to be interpreted as a person of skill in the art would understand the language based upon the context, with a further understanding that if the context provides insufficient guidance, a tolerance of 20% should be applied.

The invention claimed is:

1. A piston configured for use in a disk brake system, the piston comprising:
a body; and
a footing;
the body having
a lateral wall encircling an internal space within the piston; and
an end wall at an end of the piston, the end wall having a central portion extending outward from the end wall;
the footing positioned adjacent the end wall distal the interior space, and having a recess that receives the central portion;
wherein during operation of the disk brake system, the footing is located between a portion of the end wall and a brake pad, and the footing extends along the brake pad, and is configured to exert force on the brake pad during actuation of the disk brake system; and
the footing having a face configured to contact the brake pad, the face having a length and a width, wherein the length is longer than an outside width of the body, and the length is greater than the width, and/or the face having a cross-sectional area normal to a direction of travel of the piston that is larger than a cross-sectional area of the piston that is normal to the direction of travel of the piston; and
first and second ends of the footing located at the respective first and second ends of the length have less deflection than a midpoint of the footing corresponding to a central axis of the piston.

2. The piston of claim 1, wherein the width is wider than a width of the body.

3. The piston of claim 1 further comprising:
a spindle;
a spindle nut; and
a ball ramp actuator;
the spindle, spindle nut and the ball ramp actuator each being located at least partially within the internal space with the spindle nut threadably engaging the spindle, and the ball ramp actuator located between the end wall and the spindle nut and configured to push against the end wall and the spindle nut during operation of the disk brake system; and
at least one of the spindle and spindle nut extending into an internal piston recess defined by the central portion.

4. The piston of claim 1, wherein the footing distributes braking force from the piston over a larger area of the brake pad than a cross-sectional area of the piston.

5. The piston of claim 1, wherein during operation of the piston against a flat surface at 100 bar of pressure, the first and second ends deflect less than 0.3 mm in relation to the midpoint.

6. The piston of claim 5, wherein the first and second ends deflect less than 0.1 mm in relation to the midpoint.

7. The piston of claim 1, further comprising a ring forming a seal against debris between the footing and the body.

8. The piston of claim 1, wherein the footing is pressed onto the body.

9. The piston of claim 1, wherein the footing is cemented onto the body.

10. The piston of claim 1, wherein the footing is integral to the body.

11. The piston of claim 3, wherein the ball ramp actuator comprises two balls, each located in respective ramp races in an upper race and a lower race, and upon relative rotation of the upper and lower race, the ball moves up the respective ramp races in the upper and lower races, causing the upper race and the lower race to move apart from one another and to exert a linear force between the spindle nut and the end wall.

12. The piston of claim 11, wherein the ball ramp actuator further comprises a spring, the spring acting upon the upper race and lateral wall to preload the ball ramp actuator such that upon actuation of the disk brake system via rotation of the spindle, the piston is moved by way of the lead screw before moving by way of the ball ramp actuator.

13. The piston of claim 11, wherein a second ramp race extends from each respective ramp race to form a separate continuous track for each ball comprising one ramp race and one second ramp, and upon relative rotation of the upper and lower races in a first direction, each of the balls move up the respective ramp, causing the upper race and the lower race to move apart from one another and to exert a linear force between the spindle nut and the end wall, and upon rotation in a second direction, each of the balls move up the second ramp, causing the upper race and the lower race to move apart from one another and to exert a linear force between the spindle nut and the end wall.

14. The piston of claim 13, wherein each of the race ramps or each of the second ramps are service brake ramps, with the balls moving up the service brake ramps during operation of the brake system as a service brake, and each of the other of the race ramps and second ramps are parking brake ramps, with the balls moving up the parking brake ramps during operation the brake system as a parking brake, and the parking brake ramps comprise a stepped surface that the ball travels along.

15. The piston of claim 11, wherein the ball ramp actuator comprises three balls.

16. The piston of claim 11, wherein the ball ramp actuator comprises only two balls.

17. The piston of claim 1, wherein the piston is actuatable by hydraulic force acting upon the piston.

18. The piston of claim 3, wherein the piston is actuatable by hydraulic force acting upon the piston.

19. A method of applying a brake, the method comprising applying a linear force to an interior surface of the end wall of the piston of claim 1, whereupon a shoulder of the end wall moves the footing against the brake pad.

20. A method of applying a brake, the method comprising rotating the spindle of the piston of claim 3, wherein the rotating of the spindle causes relative rotation of an upper race and a lower race of the ball ramp and a movement of a ball bearing along a ball ramp of the ball ramp actuator, causing the upper and lower races to move apart with the lower ramp applying a linear force to an interior surface of the end wall of the piston with a shoulder of the end wall moving the footing against the brake pad.

* * * * *